United States Patent [19]
Booth

[11] Patent Number: 5,098,804
[45] Date of Patent: Mar. 24, 1992

[54] MULTIPLEXER-DEMULTIPLEXER FOR INTEGRATED OPTIC CIRCUIT

[75] Inventor: Bruce L. Booth, West Chester, Pa.

[73] Assignee: E. I. Du Pont de Nemours and Company, Wilmington, Del.

[21] Appl. No.: 422,258

[22] Filed: Oct. 16, 1989

Related U.S. Application Data

[63] Continuation-in-part of Ser. No. 297,641, Jan. 13, 1989, which is a continuation-in-part of Ser. No. 144,003, Jan. 15, 1988, abandoned.

[51] Int. Cl.$^5$ ............................................. G03H 1/04
[52] U.S. Cl. ........................................ 430/1; 430/290; 430/330; 430/394; 430/321; 430/311; 430/328; 385/16
[58] Field of Search .................. 430/1, 290, 330, 394, 430/321, 311, 328; 350/96.12, 96.3

[56] References Cited

U.S. PATENT DOCUMENTS

| | | | |
|---|---|---|---|
| 3,526,504 | 9/1970 | Celeste | 96/35.1 |
| 3,658,526 | 4/1972 | Haugh | 96/27 |
| 3,674,336 | 7/1972 | Kogelnik | 350/96 |
| 3,689,264 | 9/1972 | Chandroes et al. | 430/1 |
| 3,809,686 | 5/1974 | Chandross et al. | 260/89.5 A |
| 3,809,732 | 5/1974 | Chandross et al. | 264/22 |
| 3,814,498 | 6/1974 | Tomlinson et al. | 350/96.19 |
| 3,955,015 | 5/1976 | Ohtsuka et al. | 427/163 |
| 3,993,485 | 11/1976 | Chandross et al. | 96/27 H |
| 4,017,158 | 4/1977 | Booth | 350/162 SF |
| 4,472,020 | 9/1984 | Evanchuk | 350/96.12 |
| 4,609,252 | 9/1986 | Wong et al. | 350/96.12 |
| 4,637,681 | 1/1987 | Yamamoto et al. | 350/96.12 |
| 4,666,236 | 5/1987 | Mikami et al. | 350/96.15 |
| 4,673,241 | 6/1987 | Nishiwaki et al. | 350/96.14 |
| 4,790,615 | 12/1988 | Seki et al. | 350/96.12 |
| 4,942,112 | 7/1990 | Monroe et al. | 430/1 |
| 5,024,909 | 6/1991 | Smothers et al. | 430/1 |

OTHER PUBLICATIONS

B. L. Booth, "Photopolymer Material for Holography", Applied Optics, vol. 14, No. 3, Mar. 1975, pp. 593–601.
H. Ishio et al., "Review and Status of Wavelength-Division-Multiplexing Technology and Its Application", Jour. of Lightwave Tech., vol. LT-2, No. 4, 8/84, pp. 448–463.
Winzer, "Wavelength Multiplexing Components-A Review of Single-Mode Devices and Their Applications", Jour. of Lightwave Tech., vol. LT-2, No. 4, 8/84, pp. 369–378.
Corning, "Photocor TM Integrated-Optic Custom Components", 1989 Corning Glass Works Fiber-Optic Components Special Report, 2/89, pp. 1–5.
NSG "Optical Planar Waveguide Access Couplers", #8807-ACC-4, no date, 6 pages.
E. A. Chandross et al., "Photolocking-A New Technique for Fabricating Optical Waveguide Circuits", Appl. Phys. Lett., vol. 24, No. 2, Jan. 15, 1974, pp. 72–74.
W. S. Colburn et al., "Volume Hologram Formation in Photopolymer Materials", Applied Optics, vol. 10, No. 7, Jul. 1971, pp. 1636–1641.
W. J. Tomlinson et al., "Multicomponent Photopolymer Systems for Volume Phase Holograms and Grating Devices", Applied Optics, vol. 15, No. 2, Feb. 1976, pp. 534–541.
W. S. Tomlinson et al., "Photoinduced Refractive Index Increase in Poly(methylmethacrylate) and Its Applications", Applied Physics Letters, vol. 16, #12, pp. 486–489.

Primary Examiner—Charles L. Bowers, Jr.
Assistant Examiner—Thomas R. Neville

[57] ABSTRACT

A diffraction grating is created in the branching region of a photopolymer waveguide, preferably by directing onto the branching region coherent light through a hologram of a grating or by intersecting two or more coherent light beams on the branching region in a regular grating pattern.

5 Claims, 12 Drawing Sheets

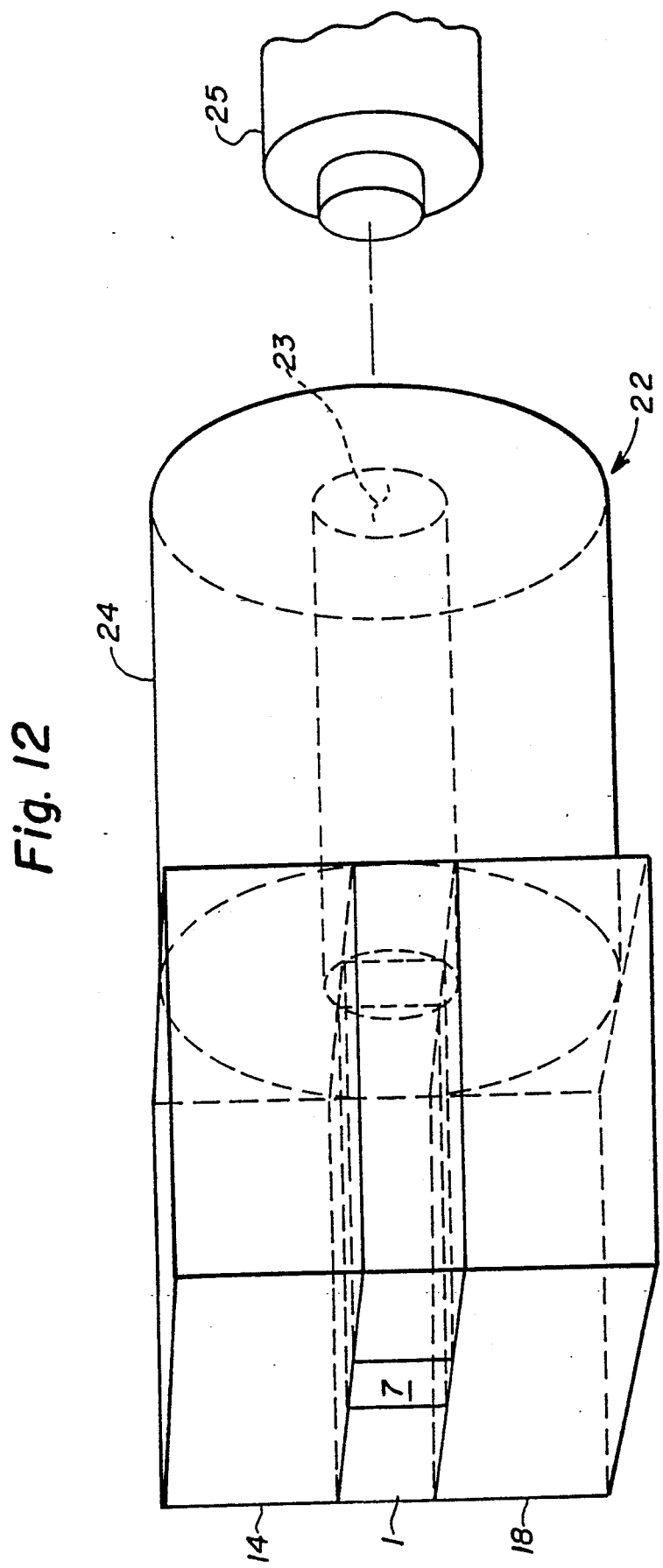

MULTIPLEXER-DEMULTIPLEXER FOR INTEGRATED OPTIC CIRCUIT

CROSS-REFERENCE TO RELATED APPLICATIONS

This application is a continuation-in-part application of copending U.S. patent application Ser. No. 07/297,641, filed Jan. 13, 1989, pending, which is a continuation-in-part application of U.S. patent application Ser. No. 07/144,003, filed Jan. 15, 1988, now abandoned.

FIELD OF THE INVENTION

This invention relates to a demultiplexer, and in particular to a demultiplexer which can formed in an integrated optic network, and to methods for making the device.

BACKGROUND OF THE INVENTION

In optical communication systems, messages are transmitted by carrier waves of optical frequencies that are generated by sources such as lasers or light-emitting diodes. There is much current interest in such optical communication systems because they offer several advantages over conventional communication systems, such as having a greatly increased number of channels of communication and the ability to use other materials besides expensive copper cables for transmitting messages. One such means for conducting or guiding waves of optical frequencies from one point to another is called an optical waveguide. The operation of an optical waveguide is based on the fact that when a medium which is transparent to light is surrounded or otherwise bounded by another medium having a lower refractive index, light introduced along the inner medium's axis is highly reflected at the boundary with the surrounding medium, thus, producing a guiding effect. The most frequently used material for such a waveguide device is glass, which is formed into a fiber of specified dimensions.

As the development of optical circuits proceeded, it became necessary to have devices which could couple, divide, switch and modulate the optical waves from one waveguide fiber to another.

Some optical fibers are interconnected by other optical fibers cut to length. These devices have only two terminals-one at each end. Photohardened films containing a waveguide have been proposed for this use, such as in U.S. Pat. No. 3,809,732. However, the device disclosed therein cannot be easily coupled to and aligned with an optical fiber. Further, due to the uneven surface of its film, one cannot easily protect its exposed surface from the environment.

Another method used to form an optical coupling device involves the application of standard photolithographic processes and diffusion. By this prior art process, standard lithographic processes are used to define a pattern in a photoresist layer deposited on a chosen substrate. Then, an etchant is applied to etch the photoresist-defined pattern into the substrate. Next, a metal is deposited in the etched region by vacuum deposition. The photoresist pattern is then lifted off with an appropriate solvent, carrying with it unwanted metal deposits. The structure is then heated to diffuse the metal deposited in the etched region into the substrate, to form a waveguiding layer therein. See, for instance, U.S. Pat. No. 4,609,252. In addition to the fact that many steps are involved in such a process, there is also a limitation on the thickness of the metal which may be deposited. First, since vacuum deposition is a relatively slow process, there is the limitation of the excessive amount of time required to deposit a thick layer of metal. Secondly, as more and more metal is deposited, new centers for deposition are created, resulting in an uneven deposit.

To form branches, two or more fibers have been bonded to a common optical port using an adhesive having an index of refraction closely matched to that of the fibers. The fibers are very small in diameter and must be handled with extreme care, bundled together for strength, and attached to a support at intervals. Fabrication of the equivalent of a printed circuit board comprised of these discrete fibers and optical devices is labor-intensive, expensive, slow, tedious, and not readily adapted to automated fabrication techniques. Another method used to form such a coupler is to fuse or melt fibers together so that light from one fiber can pass to the connected fibers. However, in such a fusion process it is difficult to control the extent of fusion and the exact geometry and reproducability of the final structure.

A device of particular interest is the "Y-coupler", which is a "y"-shaped device that couples signals together or divides them apart. "Y"-shaped devices have been made in a wet process by exposing a liquid photoactive layer to ultraviolet radiation through a mask. Then a solvent is used to remove the unpolymerized portions of the layer. See, for instance, U.S. Pat. No. 4,609,252. The waveguide of this device, like those mentioned above, isn't protected from the environment or readily coupled to an optical fiber. Further, being a wet process, it has the tendency of being messy and the problem of disposing of the spent solvent.

Another "Y"-shaped coupler device is disclosed in U.S. Pat. No. 4,666,236. It further discloses a device with one input branch and three output branches. These devices are also made by a wet process exposing a liquid photopolymer film to light to create a waveguide. The unexposed liquid film is dried and becomes part of the device. The film is further coated with a layer, such as an acrylic resin, to prevent deposition of dust and staining. Again, this process is wet and, thus, inherently messy.

U.S. Pat. No. 3,809,686 shows waveguides created in a single photopolymer film by focusing a beam of light within the film and moving the film. It shows multiple waveguides in a single film. In one embodiment, the waveguides exhibit evanescent coupling of light between the waveguides. It further teaches the creation and use of holographic diffraction gratings as light couplers. However, it is difficult to focus light within a film to form a homogenous waveguide with clear and distinct boundaries.

Superior utilization of optical communication networks may be achieved by wavelength division multiplexing. In this technique light of two or more different wavelengths is simultaneously transmitted through a single transmission channel, thus making use of the low-loss characteristics of optical fibers over a wide wavelength region. For the advantages of this technique to be realized, optical multiplexers, devices which combine light of different wavelengths into a single transmission channel, and demultiplexers, devices which separate light containing a mixture of wavelengths into individual light beams of different wavelengths, are required. Since two-way transmission, that is, transmission of information through the channel in both directions, requires a multiplexer and a demultiplexer at each end of the system, devices which can perform both functions are preferred in this application. Although the devices described in this application perform both functions, i.e., multiplexing and demultiplexing, they will be referred to as demultiplexers or demultiplexing devices, even though they could also be referred to as multiplexers or as multiplexers-demultiplexers.

As described in Seki et al. U.S. Pat. No. 4,790,615 demultiplexers for integrated-optic circuits are known. These devices comprise an optical waveguide formed by, e.g., ion exchange in a transparent substrate, e.g., glass. The waveguide is branched, comprising an input path, a branching region, a transmitting path, and an output path. A demultiplexing filter which passes (or reflects) light having a specific predetermined wavelength and reflects (or passes) light of other wavelengths is fitted into a groove machined into the glass substrate through the branching region. One such device, the Photocor ™ integrated-optic wavelength division multiplexer sold by Corning Glass Works, is manufactured by thallium ion exchange to generate waveguides on a glass substrate followed by micromachining the glass substrate to produce narrow channels into which wavelength selective filters can be placed.

In the manufacture of these devices, the groove for the demultiplexing filter must be accurately machined into the glass substrate. If the angle of the groove with respect to the waveguide is not correct, loss at the branching region will increase. Consequently the manufacture of such devices is also labor-intensive, expensive, slow and tedious, and not readily suited to automated production techniques. A need exists for a demultiplexer suitable for use with integrated optic circuits which is not labor-intensive, expensive, and slow and tedious to manufacture; whose manufacture does not have all the disadvantages associated with a wet process; and which is suited to automated production techniques.

SUMMARY OF THE INVENTION

It is an object of this invention to provide a process for forming a demultiplexer which does not possess any of the disadvantages discusses above and which is suitable for automated production techniques. This and other objectives are accomplished by a method for forming a optical demultiplexing device comprising a branched optical waveguide having a branching region comprising a diffraction grating for dividing a transmitting optical path into an input optical path and an output optical path, said waveguide being formed in a laminated and hardened matrix, said method comprising the steps of:

(A) providing a substantially dry photohardenable film having first and second surfaces, with a support removably adhered to the first surface;

(B) exposing the film to form the optical waveguide;

(C) exposing the film to form a holographic diffraction grating in the branching region of the optical waveguide;

(D) laminating a first surface of a first substantially dry photohardenable layer to the film second surface, with a support removably adhered to a second surface of the first layer;

(F) removing the support form the film first surface;

(G) laminating a first surface of a second substantially dry photohardenable layer to the film first surface, with a support removably adhered to a second surface of the second layer; and (H) hardening the layers and film forming a hardened matrix, substantially fixing the indices of refracting of the layers and the film, and forming at least one buried waveguide;

said steps being carried out in the order indicated except that step (C) may be carried out after step (A), step (B), step (D), step (E), step (F), or step (G).

The present invention is also directed to an optical demultiplexing device for use in an integrated optical system, said device comprising:

a photohardenable film having a branched waveguide formed therein, the film having a first and a second surface thereon, the waveguide forming part of an optical circuit;

the waveguide comprising an input path, a branching region, a transmitting path, and an output path so that light launched into the input path passes sequentially through the input path, the branching region, and either the transmitting path or the output path;

the branching region comprising a holographic diffraction grating disposed so that light of a predetermined wavelength launched into the input path passes sequentially through the input path, the branching region, and the output path whereas light not of the predetermined wavelength launched into the input path passes sequentially through the input path, the branching region, and the transmission path;

a first and a second photohardenable layer respectively disposed on the first and second surfaces of the film in respective positions above and below the film.

BRIEF DESCRIPTION OF THE DRAWINGS

The invention may be more fully understood from the following detailed description thereof taken in connection with accompanying drawings which form a part of this application and in which:

FIG. 12 shows a buried channel waveguide device coupled to an optical fiber with light being injected through the fiber and waveguide.

DESCRIPTION OF THE PREFERRED EMBODIMENTS

Figure 1:
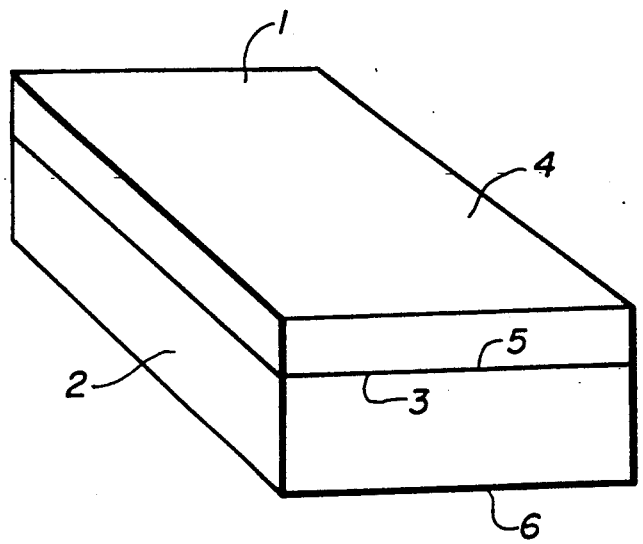
FIG. 1 is a perspective view of a photohardenable film removably adhered to a support.

Throughout the following detailed description, similar reference numerals refer to similar elements in all Figures of the drawings.

Referring to FIG. 1, an element used in the method of the present invention is illustrated comprising a substantially dry photohardenable film 1 removably adhered to a support 2. The film 1 has a first surface 3 and a second surface 4. The support similarly has a first surface 5 and a second surface 6. The first surface 5 of the support 2 is removably adhered to the first surface 3 of the film 1. In a preferred embodiment, the surfaces 3, 4, 5 and 6 of the film 1 and the support 2 are substantially flat.

The film 1 may have a thickness in the range of 2 micrometers through 15 micrometers or above, preferably in the range of 4.5 micrometers through 8.0 micrometers, and more preferably about 5 to 6 micrometers.

The first step of the method of the present invention comprises exposing to light at least a first region 7 of the film 1 polymerizing at least one monomer in the film 1 and changing the refractive index of the region 7 to form at least a first optical waveguide. The term waveguide is defined by those skilled in this art to include the entire area that transmits radiant energy. This technically includes some area just around the exposed region. However, for simplicity, the exposed region can be considered to substantially be the waveguide. In theory, the waveguide formation is believed to be due to a self-focusing property of the film material. Upon exposure to light, a polymerization reaction is induced in the exposed region. It is believed that there is interdiffusion between the exposed and unexposed regions, at least near the interface of these regions. This interdiffusion changes the refractive index of the exposed region creating a lens-like exposed region directing the light in a self focused fashion to create a narrow smooth walled waveguide of approximately the same dimension as the mask area or light beam width. Three embodiments for performing this first step are illustrated in FIGS. 2a, 2b and 2c.

Figure 2A:
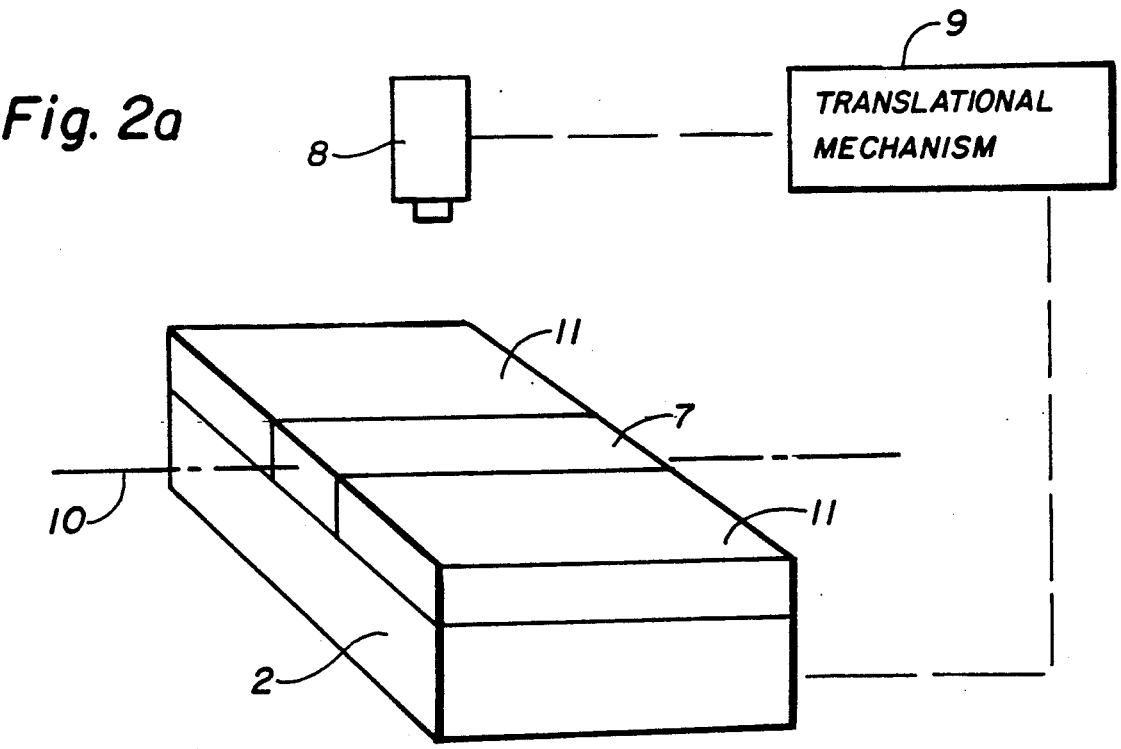
FIG. 2a is a schematic representation of a first embodiment for forming an optical waveguide element comprising a waveguide in a film on a support.

In FIG. 2a, a focused laser light source 8 exposes the region 7 to form the waveguide. A translational mechanism 9 is connected to the laser light source 8 and/or the support 2 for moving the laser light source 8, the support 2 or both, to create the waveguide having a desired and/or predetermined pattern. Here, the exposed region 7 has a substantially elongated box configuration having an optical axis 10 through the longitudinal center of the region 7. A physical cross section of the exposed region 7 perpendicular to the optical axis 10 is substantially rectangular. On both sides of the region 7 are remaining unexposed regions 11 of the film 1.

Figure 2B:
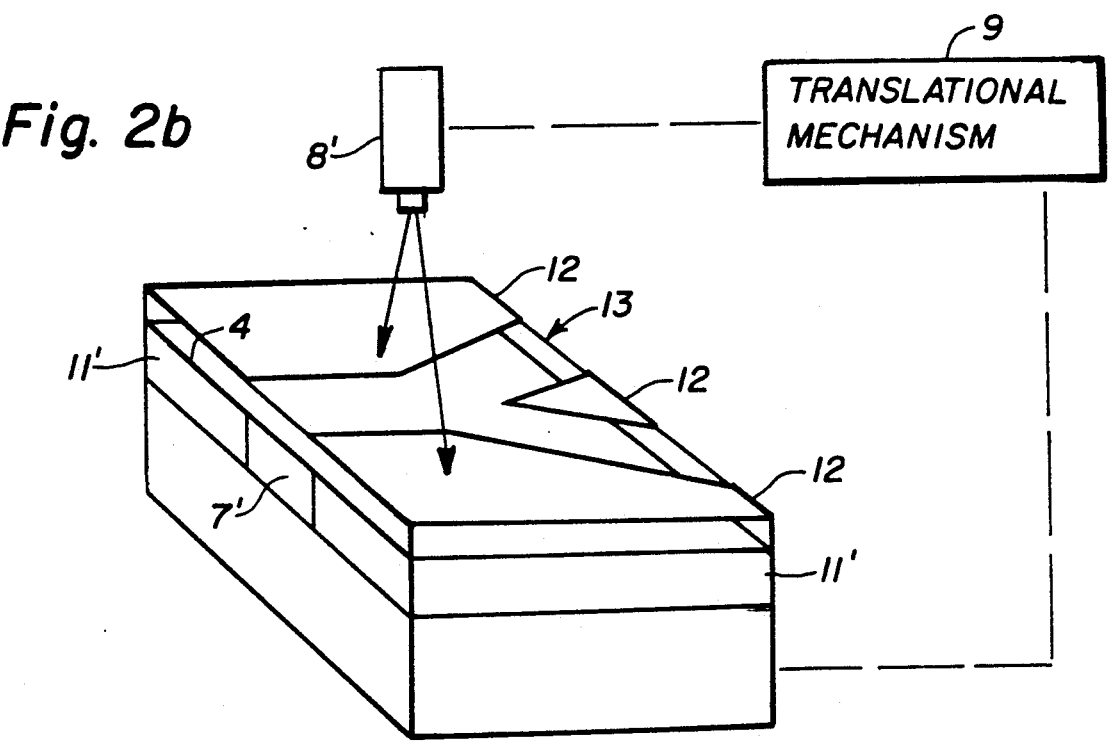
FIG. 2b is a schematic representation of a second embodiment for forming an optical waveguide element comprising a waveguide in a film on a support.

FIG. 2b shows an alternate embodiment for exposing a region 7'. Here, a non-focused laser light source 8' is generally directing actinic radiation toward the element of FIG. 1. By "actinic radiation" is meant radiation which is active to produce the free-radicals necessary to initiate polymerization of the monomeric material. An opaque mask 12 is positioned between the laser light source 8' and the film 1, typically contacting and covering the second film surface 4. The mask 12 has at least a patterned area 13 therein through which actinic radiation from the light source 8' exposes region 7'. The patterned area can have any desired configuration, including the substantially Y configuration shown in FIG. 2b. Exposing the region 7' through this area 13 results in the creation of a waveguide having a substantially Y configuration. Described more generically, the region can have one end adapted to inlet or outlet light connected to a plurality of ends (e.g., 2, 3, 4 . . .) adapted to inlet or outlet light. As in the FIG. 2a embodiment, there are remaining unexposed regions 11' in the film 1.

Figure 2C:
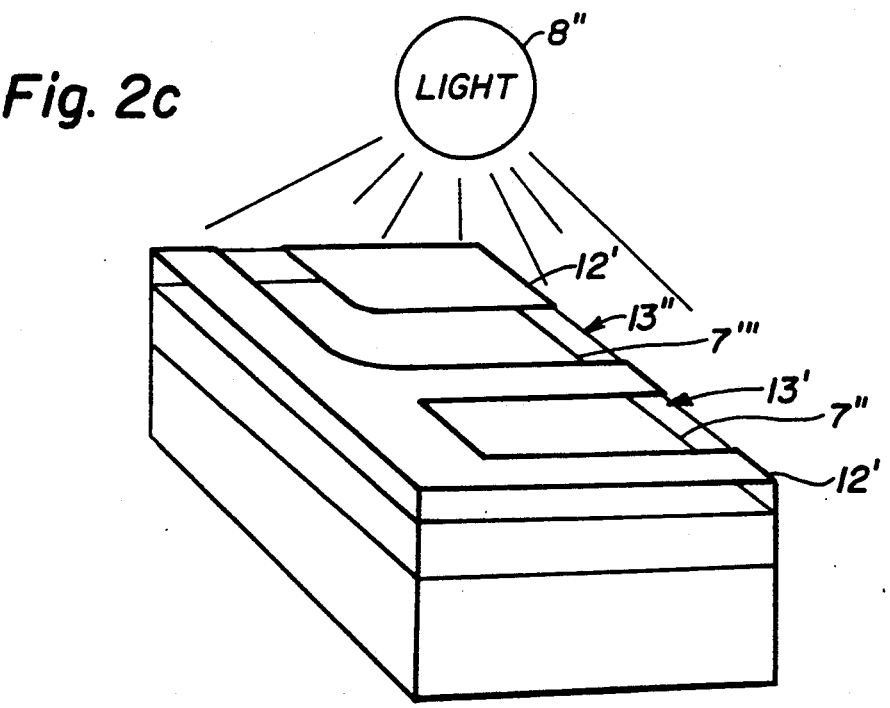
FIG. 2c is a schematic representation of a third embodiment for forming an optical waveguide element comprising a waveguide in a film on a support.

A third embodiment for performing the exposing step of the present method is illustrated in FIG. 2c. Here, actinic radiation from a light source 8" exposes a first region 7" and a second region 7'" of the film 1 through an opaque mask 12'. This mask 12' has first and second areas 13' and 13" for the light to pass through exposing regions 7" and 7'", respectively. The second area 13" approaches and is in part parallel to the first area 13'Thus, after exposure, the exposed second region 7'" and the corresponding waveguide approaches and is in part parallel to the exposed first region 7" and the corresponding waveguide. As a result, the waveguides can be positioned to exhibit evanescent coupling of light injected into one of the waveguides by gradually leaking or coupling the injected light into the other waveguide.

In each of these preferred embodiments, after exposure, the first and second surfaces 3 and 4 of the film 1 remain substantially flat. This facilitates subsequent laminating of layers on the film surfaces. As such, FIGS. 2a, 2b and 2c illustrate the making of optical waveguide elements in accordance with this invention useful in making optical waveguide devices which in turn are useful in integrated optical systems.

Figure 3:
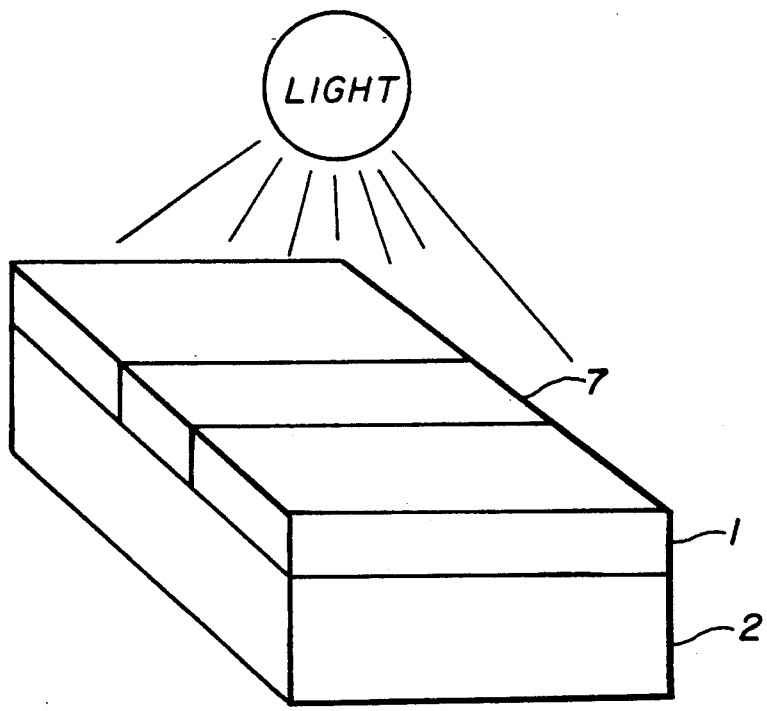
FIG. 3 depicts an optional step of flooding the film having a waveguide on a support with light resulting in an element.

FIG. 3 illustrates an optional step which follows the exposing step. The element resulting from the exposure step can be flooded with light, such as broadband ultraviolet light. This polymerizes some of at least one monomer in the film and typically most or all of one or all of the monomers in the film. This may allow for easy removal or attachment of the support 2. This resulting optical waveguide element can similarly be used in making optical waveguide devices in accordance with the method of this invention.

Figure 4:
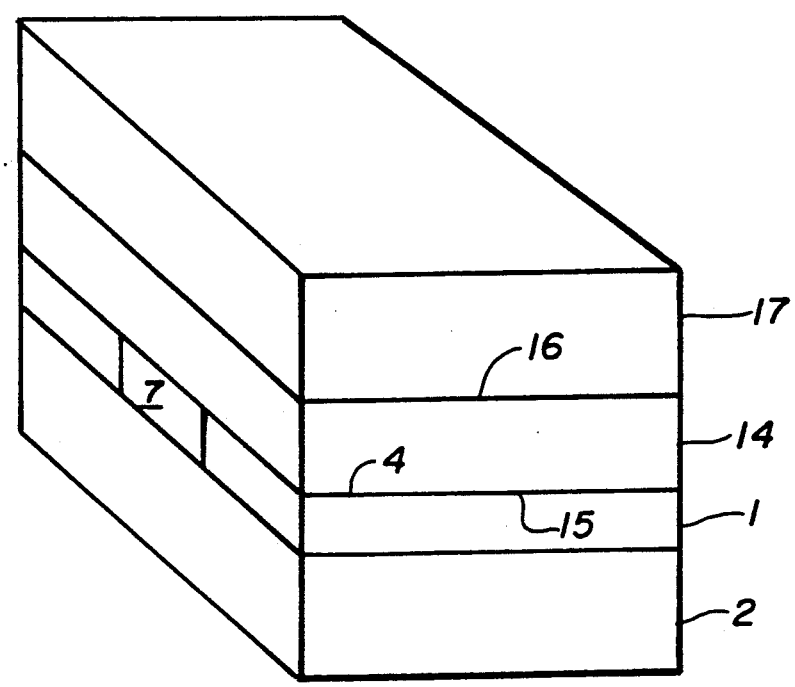
FIG. 4 shows a laminated element comprising from top to bottom a support, a photohardenable layer, a film having a waveguide, and another support.

Next, referring to FIG. 4, a first substantially dry photohardenable layer 14 is laminated to the second film surface 4. The first layer 14 has first and second surfaces 15 and 16, respectively. The first layer 14 first surface 15 is laminated to the second film surface 4 by placing them in intimate contact and controllably applying pressure with rollers to remove air between the film 1 and layer 14. The first layer 14 is tacky. If the optional flooding step illustrated in FIG. 3 is not performed, then the film 1 is also tacky. Thus, the film 1 and first layer 14 easily adhere to one another. A support 17 is removably adhered to the second surface 16 of the first layer 14. FIG. 4 illustrates another optical waveguide element in accordance with the present invention useful in making optical waveguide devices.

Figure 5:
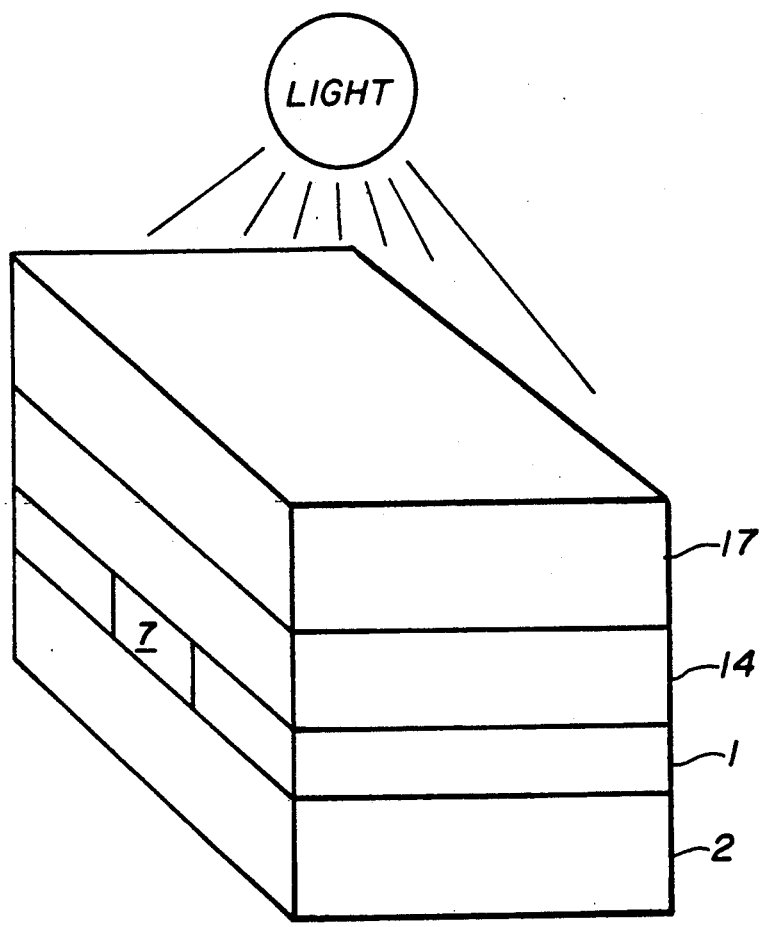
FIG. 5 illustrates an optional step of flooding the element of FIG. 4 with light.

FIG. 5 shows an optional flooding step similar to that illustrated in FIG. 3, except the element being flooded is modified as described in relation to FIG. 4. The element resulting from the first laminating step can be flooded with light, such as broadband ultraviolet light. This polymerizes some of at least one monomer (and typically most or all of one or all of the monomers) in the first layer 14 and further polymerizes some of the at least one monomer in the film 1 (if not already polymerized by a previous flooding step). Extensive crosslinking or polymerization occurs between the monomer(s) of the layer 14 adjacent to the monomer(s) of the film 1 forming a diffuse boundary line or region. The resulting optical waveguide element is also useful in making an optical waveguide device in accordance with this invention.

Figure 6:
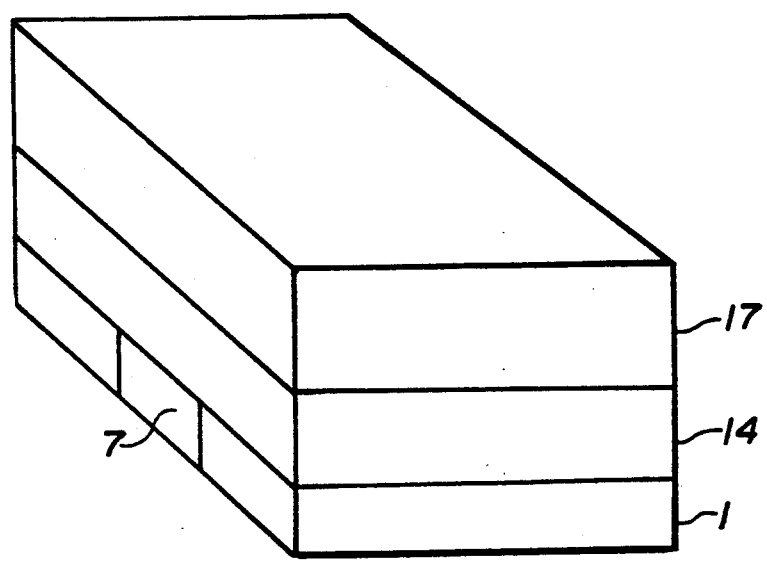
FIG. 6 is the element of FIG. 4 or 5 with one of the supports removed.

FIG. 6 shows the element after the next step of removing the support 2 from the film 1 first surface 3.

Figure 7:
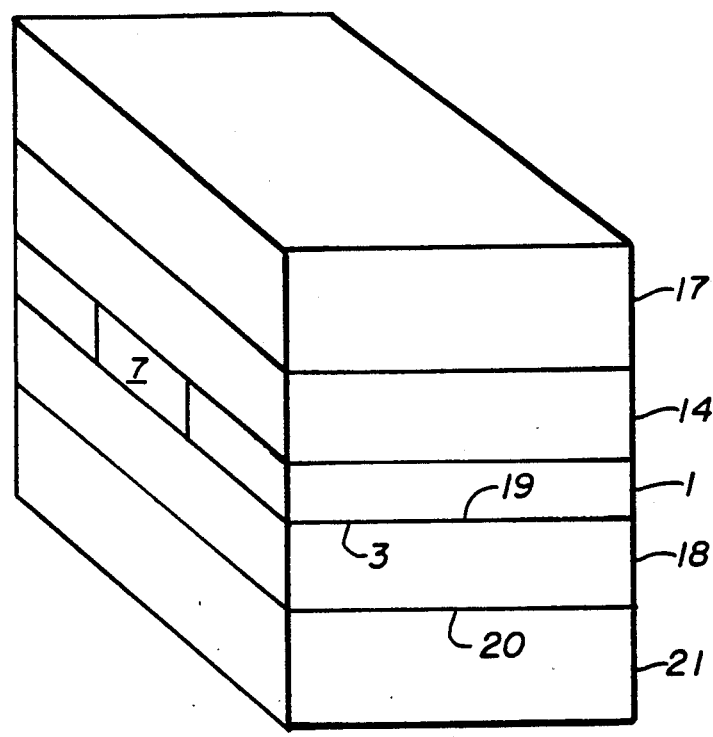
FIG. 7 is a perspective view of an optical waveguide element comprising from top to bottom a support, a photohardenable or photohardened layer, a film having a waveguide, a photohardenable layer, and a support.

Then, referring to FIG. 7, a second substantially dry photohardenable layer 18 is laminated to the film 1 first surface 3. The second layer 18 has first and second surfaces 19 and 20, respectively. The second layer 18 first surface 19 is laminated to the film first surface 3 by placing them in intimate contact and controllably applying pressure with rollers removing air between the film 1 and the second layer 8. The second layer surfaces 19 and 20 are tacky and, thus, easily adhere to the film 1. A support 21 is removably adhered to the second layer second surface 20. Another optical waveguide element results which is useful in making optical waveguide devices.

Figure 8:
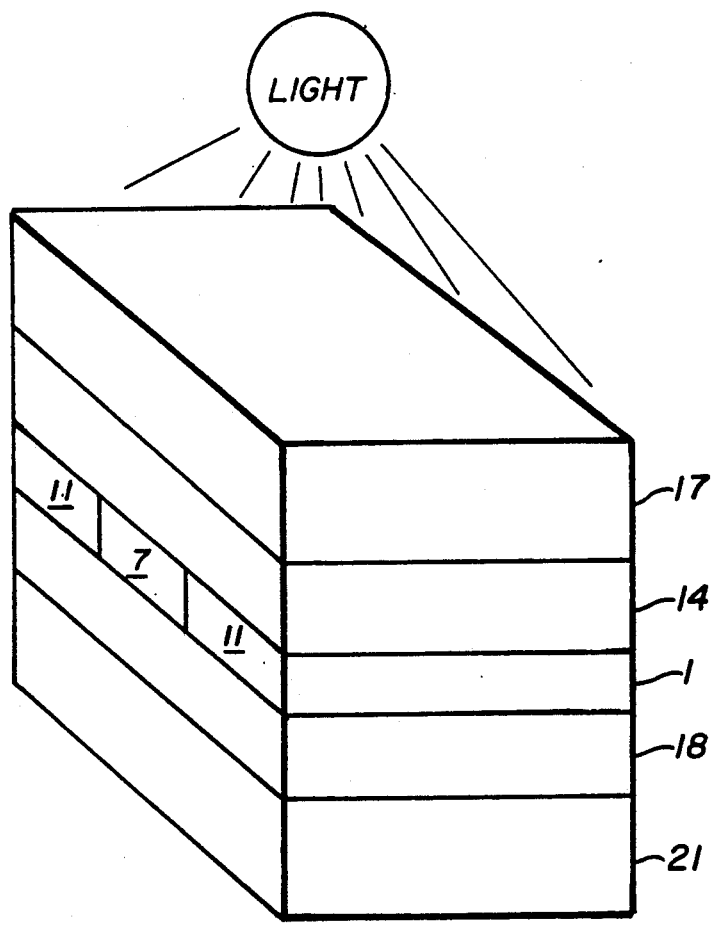
FIG. 8 shows the step of hardening the element of FIG. 7 by flooding it with light.

FIG. 8 illustrates a step of hardening the element depicted in FIG. 7 by flooding it with light, such as broadband ultraviolet light. Throughout this application, the term "broadband ultraviolet light" means light in the spectral region of about 350 through 400 nanometers. This step occurs for minutes, preferably 5, but can last longer. If this is the first flooding step, then this is the first polymerization of at least one monomer (and typically most or all of one or all monomers) in the remaining regions 11 in the film 1 and the first and second layers 14 and 18, respectively. It further polymerizes the at least one monomer in the region 7 of the film 1. If this is not the first flooding step, it polymerizes at least one monomer in the second layer and continues polymerizing the at least one monomer in the rest of the element. Some crosslinking or polymerization occurs between the previously polymerized film 1 and the monomer(s) in the second layer 18 forming a boundary line or region that is more evident than if the film 1 had not previously been flooded with light. A device results having at least one buried channel waveguide in a laminated and photohardened matrix useful in integrated optical systems.

Figure 9:
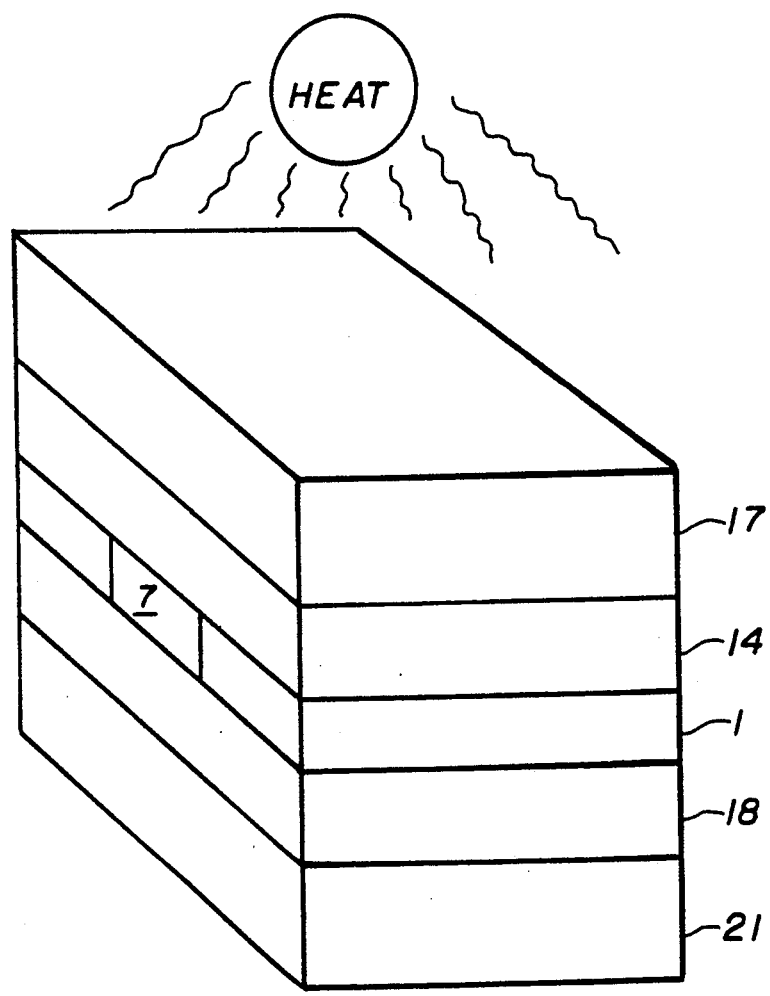
FIG. 9 shows the step of hardening the element of FIG. 7 or the device of FIG. 8 by heating it.

FIG. 9 illustrates another possible step of hardening the element depicted in FIG. 7 by heating it. Actually, the layers and film can be heated before, in combination with, after, or in lieu of the light flooding step to harden or further harden the device. This heating step occurs at a temperature in the range of about 50° C. through 200° C. and preferably in the range of about 100° C. through 150° C. for a duration of minutes, preferably more than five minutes, more preferably about sixty minutes, or longer.

Photohardenable compositions are typically less sensitive to temperatures up to 100° C. than above 100° C. However, hardening may be initiated as low as 50° C. if held at the temperature for a sufficient period of time. As the temperature is increased beyond 100° C., thermally initiated hardening increases significantly.

It has also been observed that it can be advantageous to employ an additional step after lamination of the first buffer layers 14 and 18 directly on the waveguide film 1, which has only been exposed image-wise in the waveguide region 7. The added step is a predetermined wait period at a predetermined temperature to allow for inter-layer diffusion of the chemical components of the buffer layers 14 and 18 and the waveguide film 1, so that the refractive index profile and magnitude of the waveguide 7 relative to the waveguide film 1 and buffer layers 14 and 18 can be controlled. For single-mode guiding the preferred embodiment for waveguide 7 comprises having a relatively uniform, nearly step-like to parabolic-like index profile running perpendicular to the parallel planes of the layered structure formed by layers 14 and 18.

Control of both the length of the predetermined wait period and the temperature at which the waveguide device is held during this period can be used to control the waveguiding properties of waveguide 7. While the predetermined wait period may depend on temperature, an interval of about 5 to 45 minutes is typically required. In general, longer wait periods do not markedly alter the waveguiding properties of waveguide 7. During the predetermined wait period, it is desirable to maintain the entire apparatus at a temperature at or above ordinary room temperature but below that at which hardening would occur. It is preferred that the optional flooding step illustrated in FIG. 3, carried out before lamination of the first buffer layer 14, and the optional flooding step illustrated in FIG. 5, carried out after the first buffer layer 14 has been laminated to waveguide film 1, be omitted. In this fashion diffusion into the waveguide film 1 may occur from both waveguide layers 14 and 18.

Additionally, during the predetermined wait period such diffusion can occur between the unhardened regions of waveguide film 1 and buffer layers 14 and 18. This facilitates control of the refractive index of waveguide 7 relative to that of waveguide film 1; enhances the ultimate strength and uniformity of the bonding at the interface of waveguide 1 and buffer layers 14 and 18; and modifies the final properties of the waveguide film 1, such as hardness as a function of temperature, due to the diffusion of crosslinking monomers into waveguide film 1 from buffer layers 14 and 18. The ensuing hardening step can be accomplished either by thermal hardening or photohardening, as previously described. This improved method of refractive index profile control provides the waveguide designer with more flexibility in construction of high-efficiency photopolymer optical waveguides.

After the hardening step, a maximum refractive index increase in the localized waveguide region as measured by an AUSJENA Interphako microscope occurs in the film 1 in the range of 0.001 through 0.40 measured at 546 nanometers wavelength. The localized refractive index increase, Δn, for the purposes of this invention, is derived by conventional shearing interference microscopy techniques and is calculated assuming a uniform index shift through the film such that Δn is effectively an average using the following equations:

$$f\lambda = \Delta d$$

$$f = \frac{a}{b}$$

$$\frac{a\lambda}{b} = \Delta d$$

where
 d = assumed waveguide thickness, typically the film thickness
 a = waveguide fringe shift
 b = fringe spacing
 $\lambda = 0.546 \mu$ wavelength of light in the microscope.

This localized refractive index increase is not to be confused with a refractive index modulation measured from gratings prepared holographically, as described by Kogelnik (H. Kogelnik, *Bell Syst. Tech. J.*, 48, 2909–2947, 1969).

After the hardening step, the waveguide is transparent in the range of 0.6 through 1.6 micrometers wavelength. It is effectively transparent at 1.3 micrometers for single mode operation.

Also after the hardening step, the maximum refractive index of the matrix except in and near the waveguide is in the range of 1.45 through 1.60 measured at 632 nanometers depending on formulation and/or extent of interlayer diffusion from adjoining layers or film of different indexes. The refractive index is determined by using an ABBE refractometer manufactured by Karl Zeiss.

Figure 10:
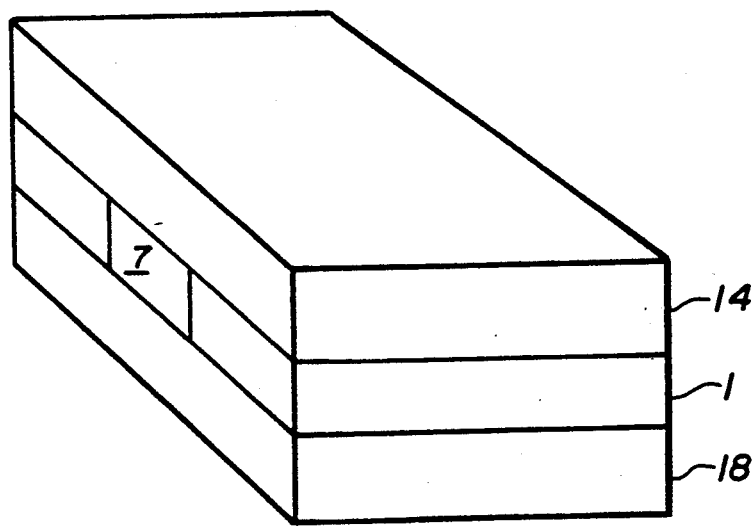
FIG. 10 is a perspective view of an optical waveguide device for use in integrated optical systems, the device comprising from top to bottom a first hardened layer, a hardened film having a waveguide, and a second hardened layer.

The supports 17 and 21 can be removed from the device resulting from the hardening step as shown in FIG. 10.

It has been found that a time delay of 5 to 120 minutes, preferably 20 to 30 minutes, after each flooding step and before removal of support sheets and/or subsequent lamination is also desirable to facilitate interlayer diffusion and polymerization.

Figure 11:
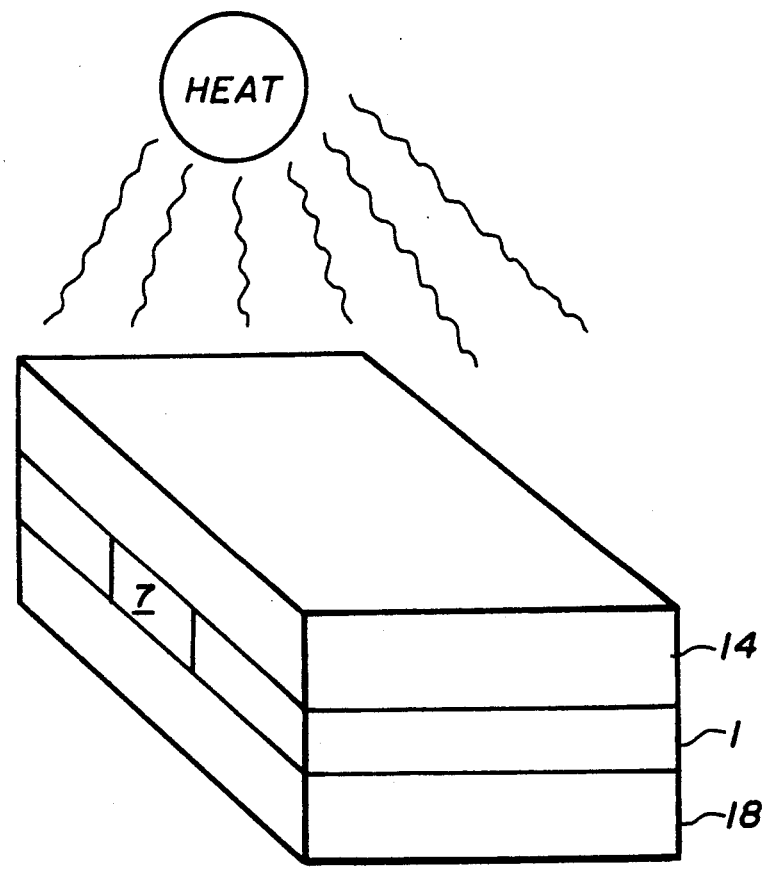
FIG. 11 shows the step of stabilizing the element of FIG. 10 by heating it.

FIG. 11 shows an optional, but preferred, step of stabilizing the device shown in FIG. 10 by heating it, typically after the hardening step. This heating step similarly occurs at a temperature in the range of about 50° C. through 200° C. and preferably in the range of about 100° C. through 150° C. However, this stabilizing step stabilizing step occurs in the range of about 30 minutes through 2 hours and more preferably for about an hour. This heating makes the device more environmentally stable ensuring water and other elements in the environment will not interfere with proper operation of the device. Further, this heating provides thermal stabilization of optical and mechanical properties allowing operation of the resulting device over a wide range of temperatures without modification of the device properties.

In the device of FIG. 10 or 11, the first and second layers 14 and 18, respectively, have equal thicknesses. Further, the remaining regions 11 are equal in size and symmetric on either side of region 7. As such, the device has a buried channel waveguide that can be dimensioned to easily couple to virtually any optical fiber. FIG. 12 shows the device of either FIG. 10 or 11 coupled to an optical fiber 22. The fiber has a cylindrical core 23 and a cylindrical cladding 24 surrounding the core 23. Standard single mode fiber has a cladding diameter of about 125 microns and a core diameter of about 7 microns. The laminated waveguide device, now clad from above and below, is shown advantageously coupled to the optical fiber 22 simply by abutting the fiber core 23 to the buried waveguide aligning their optical axes. This is accomplished by merely positioning the optical waveguide device adjacent the optical fiber on a flat surface, if the dimensions of the device are preselected for the particular fiber. This aligning can be facilitated by using a film 1 having a thickness which substantially defines one dimension of a substantially rectangular cross section of the waveguide. For coupling to standard single mode fiber, the film thickness should be about 5 to 6 micrometers, preferably 5.3; the exposure width should be about 5 microns; and each one of the first and second layers should be about 25–75 micrometers thick. The total matrix thickness can be made any dimension including about 125, 180 and 200 micrometers.

FIG. 12 also shows the step of injecting light from a light source 25 into and through the optical fiber 22 and buried waveguide.

Figure 13A:
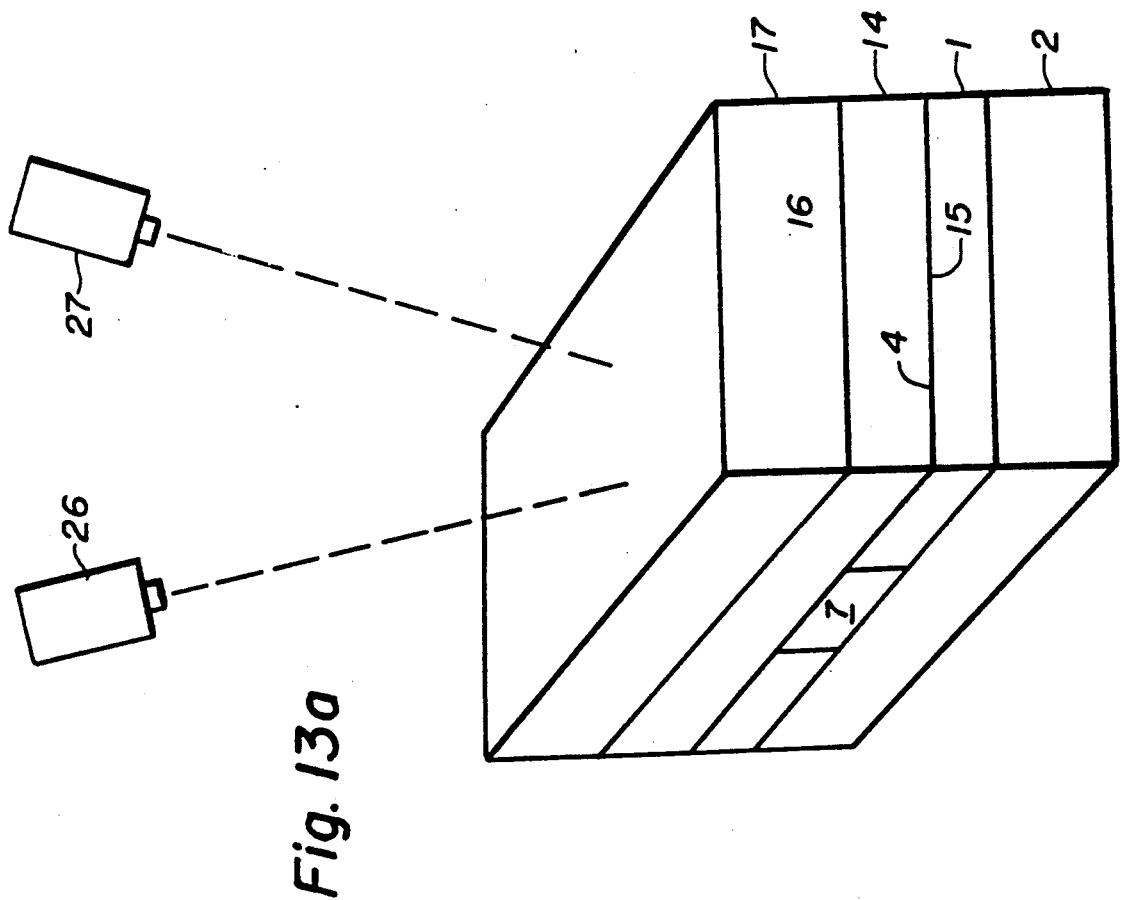
FIG. 13a illustrates directing coherent light within the element of FIG. 4 to produce a holographic diffraction grating.

FIG. 13a illustrates an optional step of directing at least two coherent light beams, such as from beam directing means 26 and 27 to intersect in an area within the element of FIG. 4. As well known to those skilled in the art, two coherent light beams may be produced by splitting the output of a single laser with a beam splitter and the resulting beams directed to intersect within the element by various optical elements, e.g., mirrors, lens, gratings, and combinations thereof. These beams are directed to provide a resultant light intensity that spatially varies in such a way as to produce a holographic diffraction grating 28. More specifically, the grating produced by this process is a volume grating as opposed to a surface grating. A volume grating is three dimensional, rather than planar.

The volume gratings made in accordance with the present invention are high diffraction efficient gratings. This means that the gratings approach or exceed 95% efficiency when the grating spacing is much less than the thickness of the grating. These volume or thick phase diffraction gratings are capable of deflecting or diffracting a narrow range of wavelengths with a narrow angular range with very little light at the center (Bragg angle) wavelength passing through undiffracted.

The grating comprises regions of varying refractive index for input of light to the waveguide or waveguide portion or output of light from the waveguide or waveguide portion. A grating can direct light to or from a waveguide in the film or to or from one of the layers or from a waveguide or waveguide portion in the film (or one of the layers) to another waveguide or waveguide portion within the film (or the one layer). Further, as well known in the art, gratings can be wavelength selective so that they only direct a predetermined range of light wavelengths. Gratings having virtually any dimensions can be formed in accordance with the present invention. Thus, long or thick gratings can be formed for passing narrow ranges or bands of wavelengths where the length that light travels through the grating is about five or more times greater than the grating spacing.

Figure 13B:
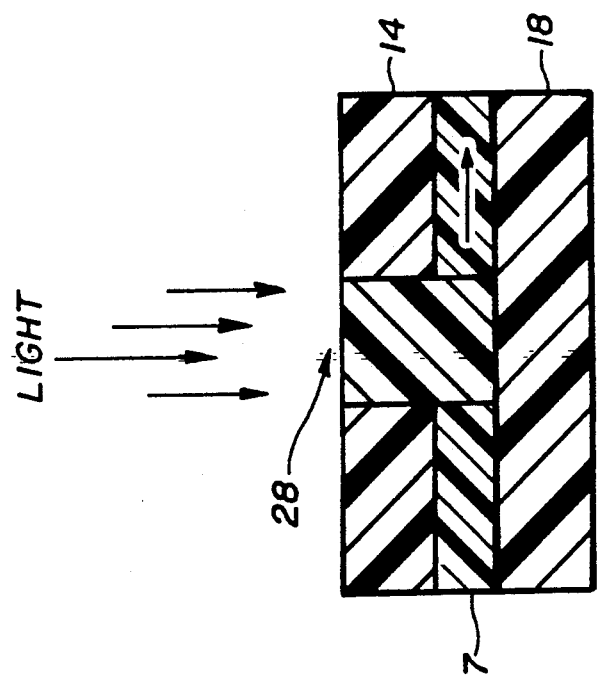
FIG. 13b is a cross sectional representation of a holographically formed grating coupling light to a waveguide buried between layers.

FIG. 13b shows a cross section of the FIG. 10 or 11 device having the holographic diffraction grating 28 in the first layer 14 and the region 7. The grating 28 can be in areas selected from the group consisting of at least part of the region, at least part of one of the layers near the region, and combinations thereof, provided that there has been no previous hardening step for the film and/or layer in which the grating is to be constructed. As an alternative to the method of forming a grating illustrated in FIG. 13a, a similar grating can be formed by directing, before any hardening step, a coherent light beam through a grating at the Bragg angle and then through an area selected from the group consisting of at least part of the region, at least part of one of the layers near the region, and combinations thereof to reproduce or form a holographic diffraction grating in a device. Further, the directing step can be accomplished at other stages of development of the device described herein.

For instance, the directing step can be performed prior to the exposing step, i.e., before the formation of any waveguide. The directing step can be performed subsequent to the exposing step, i.e., after the formation of one or more waveguides. Further, at least one grating can be formed in the same film or layer where one or more waveguides are present. In addition or as an alternative to having at least one grating in the same film or layer where at least one waveguide is present, one or more grating can be formed in one or more layers laminated on either side of a film or layer containing at least one waveguide. A grating can be formed in a layer prior or subsequent to the layer being laminated onto another layer.

A grating can be located and relay light between distinct waveguides in the same or different layers where the waveguides have longitudinal axes that are colinear or non-colinear. A grating can be located at the end of a waveguide, partially or totally coexisting in a volume with a waveguide or adjacent to a side of a waveguide and still direct light into or out of the waveguide.

One can also arrange diffraction gratings to not only deflect light within waveguides or to deflect light in the layer of the waveguide, but also to deflect light out of a first waveguide in a first layer (e.g., normal or at some angle to the waveguide layer), optionally passing through buffer layers to optical fibers, to other collection means on the outside of the element or device, or into or by another grating in another layer to deflect light into another waveguide removed from the first. Thus, these waveguide and grating combinations can be configured to be input and output couplers in the same layer or in multilayers.

All of the gratings noted above can also be chirped, which means starting with a slightly smaller grating spacing, moving to a slightly longer spacing over a reasonable (e.g., 30–40 microns) length, possibly greater, permitting light with slightly different wavelengths to diffract from different regions of the gratings as the way of compensating for wavelength drift in the laser diode sources.

All of these gratings can be produced by the interference of light either directly by interfering laser beams in a holographic sense or indirectly by copying a master grating which has been created holographically. The master grating is laminated to an unexposed portion of the material of interest. One laser light beam can then regenerate both interfering beams in the exposing medium through the master grating. After the copy is made in the material of interest, the master grating is removed.

In addition to using the waveguide grating combinations for wavelength division multiplexing and demultiplexing, input/output coupling can be achieved for both sensor devices, as well as interconnects to optical circuits and/or telecommunication devices. These gratings will permit communication from one side of the circuit board to the other side of the circuit board for interconnection to optical emitters, detectors, and electronic components, and similarly, the interconnections between multiple layered waveguides.

Figure 14:
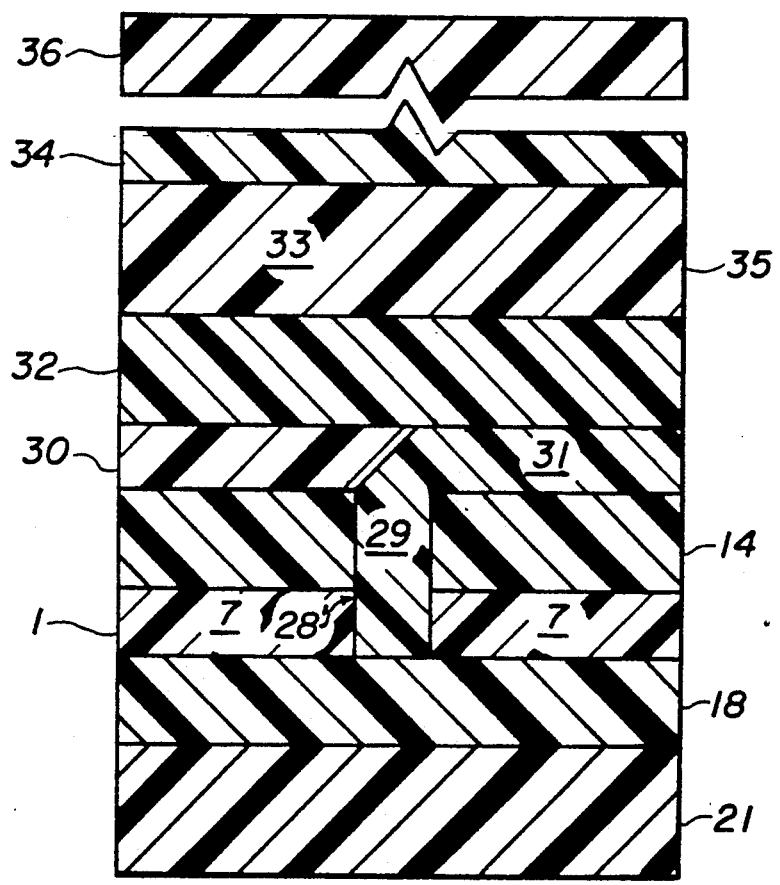
FIG. 14 is a cross sectional view of a laminated device having a film, multiple layers, an end support, waveguides and a grating.

One of the advantages of the present invention is the ease of adding one or more substantially dry photohardenable or photohardened layers with or without a waveguide or grating. This versatility is demonstrated in the device illustrated in FIG. 14. This optical waveguide device has exposed regions 7, 29, 31 and 33 in film 1 and layers 14, 30 and 35, respectively. It further shows buffer layers 18, 32, 34 and 36, and a support 21. Region 7 has a holographic diffraction grating to direct light from region 7 to region 29 or the reverse. As an alternative to using a grating to change the direction of light, layer 30 illustrates other techniques, such as one disclosed in U.S. Pat. No. 4,472,020, are possible. Further, the break between layers 34 and 36 is intended to show that devices can have as many or few layers as desired. Of course, waveguides in different layers or in the film and a layer could be formed to exhibit evanescent coupling therebetween.

Diffraction gratings can be placed not only in or between ends of straight waveguides, but they can also be located at a cross-over or intersection, such as of an "X" or "Y" shaped waveguide, whereby light traveling into the crossing region can be diffracted with a selected range of wavelengths passing through the intersection into any predetermined one of the connected branches or back in reverse from the intersection. A device containing an X shaped waveguide with a grating in its intersection can be designed such that the wavelengths for which the grating is not specific will continue straight through the cross-over to continue travel in a waveguide portion having a longitudinal axis that is colinear with the longitudinal axis of the waveguide portion from which the light entered the intersection.

As such, the method, elements and devices of the present invention can be used to create one or more high diffraction efficiency volume phase gratings in a material and permits combining gratings with one or more waveguides in a variety of ways to construct wavelength division multiplexers, devices which combine light of different wavelengths into one transmission channel, or demultiplexers, devices which separate the light into plural light beams of different wavelengths.

Figure 15:
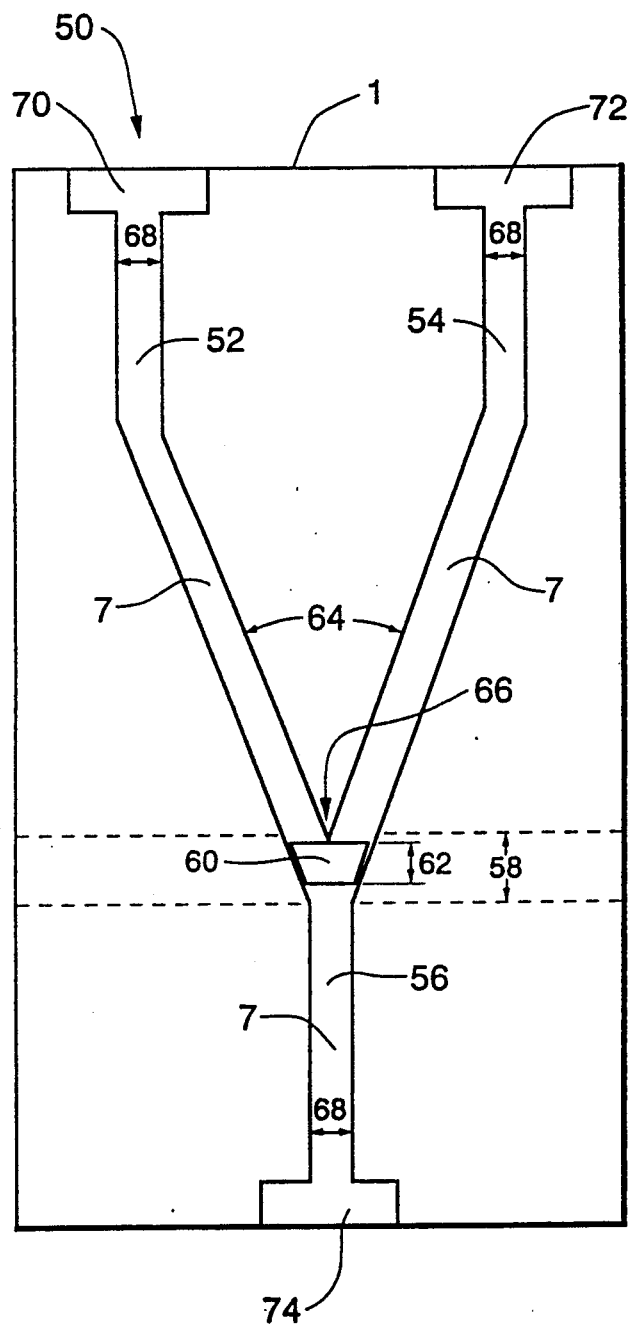
FIG. 15 is schematic representation of a top view of a demultiplexer of the present invention.

FIG. 15 shows a demultiplexer of this invention, generally referred to by reference character 50, shown in top view. For clarity of illustration, waveguide 7 is shown in solid lines. As mentioned above, the device can perform both multiplexing and demultiplexing functions, but will be referred to as a demultiplexer or demultiplexing device for purposes of simplicity.

The demultiplexer 50 includes film 1 in which waveguide 7 is formed. As will be developed, waveguide 7 has a predetermined pattern associated therewith which defines predetermined operational paths and regions of demultiplexer 50. As described above, and illustrated in FIG. 10, demultiplexer 50 is realized in a composite element formed from substantially dry photohardenable film 1 and substantially dry photohardenable layers 14 and 18. Additional photohardenable layers, laminated to layers 14 and 18, may be present if desired. The element in which the demultiplexer 50 is formed may itself be part of an integrated optic circuit implemented of such photohardenable materials.

As may be seen from FIG. 15, waveguide 7 is branched with transmission path 56 branching to input path 52 and output path 54 at branching region 58. The branching region 58 includes diffraction grating 60, having an effective length 62. Incident path 52 and output path 54 separate at an angle indicated as branching angle 64. The branching region 58, which includes Y-branch 66, is a progressive widening of waveguide 7 leading to a split. The details of the Y-branch are set forth below. In order to couple effectively to an optical fiber the waveguide 7 should have width 68 which permits mode matching mode matching to an optical fiber, typically about 6 to 9 microns.

Coupling means 70, 72, and 74 are disposed respectively in input path 52, output path 54, and transmission path 56 for coupling these respective paths to an optical circuit. The means 70, 72, and/or 74 may take any of a variety of forms. To couple demultiplexer 50 to a glass optical fiber the coupling means 70, 72, and/or 74 may take the form of a butt coupling, an ablated groove, or an end fire coupling. The coupling means may also take the form of a diffraction grating for coupling either to an optical fiber or to another grating in another photohardenable film or to another waveguide within the same film. Yet further, the coupling means may simply take the form of a continuation of the waveguide in the same film in which the demultiplexer is disposed.

As described above, grating 60 is formed by the interference of light, either directly, by the interference of two beans of coherent radiation, or indirectly, by copying a master grating. Exposure to form grating 60 may be carried out at any time before the hardening step, for example, before exposure to form waveguide 7, after exposure to form waveguide 7, after lamination of first layer 14, or after lamination of second layer 18. Grating 60 may extend beyond waveguide 7, either into the film on one or both sides of waveguide 7 and/or into buffer layers 14 and/or 18. For efficient diffraction of light of the predetermined wavelength from input path 52 to outpath path 54, grating 60 should be located as close to the branch point as possible.

Grating 60 is selective so that only light of a predetermined wavelength launched into input path 52 is diffracted into output path 54. Light not of the predetermined wavelength passes through the grating into transmission path 56. As well known to those skilled in the art, the wavelength which will be diffracted by a grating can be calculated from the grating spacing, the effective refractive index of the material in which the grating is formed, and the angle of incidence of the radiation to the grating using Bragg's and Snell's laws.

As stated above, the selectivity of grating 60 is related to its length. A length of 20 to 500 micrometers, preferably 50 to 250 micrometers, is preferred, although longer or shorter gratings could be used if greater or lesser selectivity were desired. By processes of this invention gratings of a predetermined length and grating spacing, and consequently predetermined selectivity and wavelength, can be prepared. Prior art demultiplexers, such as those described in Seki et al. U.S. Pat. No. 4,790,615, use dielectric filters which are difficult and expensive to manufacture.

All layers including those designated by the numbers 14, 18, 30, 32, 34, 35 and 36 can be made out of the same material as the film. Then the hardened device matrix is substantially homogenous in composition and refractive index except in and near the waveguide. Preferably, however, after the hardening step, the waveguide has a refractive index about 0.005 to 0.060 greater than the hardened film and about 0.001 to 0.025 greater than the hardened layers. Of course, regardless of whether different materials are used for different layers and the film, the composition and refractive index in each exposed region is substantially homogenous in composition and refractive index.

The photohardenable film and layers used herein are thermoplastic compositions which upon exposure to actinic radiation form crosslinks or polymers of higher molecular weight to change the refractive index and rhelogical character of the composition(s). Preferred photohardenable materials are photopolymerizable compositions, such as disclosed in U.S. Pat. No. 3,658,526. In these materials, free radical addition polymerization and crosslinking of a compound containing one or more ethylenically unsaturated groups, usually in a terminal position, hardens and insolublizes the composition.

While the photopolymerizable film or layer is a solid sheet of uniform thickness it is composed of three major components: a solid, solvent soluble, preformed polymeric material known as the binder; at least one liquid ethylenically unsaturated monomer capable of addition polymerization to produce a polymeric material; and a photoinitiator system activatable by actinic radiation. Although the film or layer is solid composition, components interdiffuse before, during and after imaging exposure until they are fixed by the hardening step. Interdiffusion may be further promoted by incorporation into the composition of an otherwise inactive plasticizer. In addition to the liquid monomer, the composition may contain solid monomer components capable of interdiffusing in the solid composition and reacting with the liquid monomer to form a copolymer.

In the preferred compositions for use as the film or layers in this invention, the binder and the liquid monomer are selected so that the monomer contains one or more substituents selected from the group consisting of (1) an aromatic moiety selected from the group consisting of (i) unsubstituted phenyl, (ii) substituted phenyl, (iii) substituted or unsubstituted naphthyl, and (iv) substituted or unsubstituted heterocyclic aromatic having up to three rings, (2) chlorine, (3) bromine, and mixtures thereof, and the binder is substantially free of the specified substituents. The monomer contains at least one such substituent and may contain two or more of the same or different substituents of the group, provided the monomer remains liquid. Contemplated as equivalent to the groups are substituted groups where the substitution may be lower alkyl, alkoxy, hydroxy, cyano, carboxy, carbonyl, amino, amido, imido or combinations thereof provided the monomer remains liquid and diffusable in the photopolymerizable layer.

Preferred liquid monomers are 2-phenoxyethyl acrylate, 2-phenoxyethyl methacrylate, phenol ethoxylate acrylate, 1-(p-chloro phenoxy) ethyl acrylate, p-chlorophenyl acrylate, phenyl acrylate, 1-phenylethyl acrylate, and 2-(2-naphthyloxy)ethyl acrylate. While monomers useful in this invention are liquids, they may be used in admixture with a second solid monomer of the same type, e.g., N-vinyl-carbozle.

Preferred binders are cellulose acetate butyrate polymers; acrylic polymers and inter polymers, such as polymethyl methacrylate; polyvinylacetate; copolymers of vinyl acetate with tetrafluoroethylene and/or hexafluoropropylene; polyvinyl acetal; polyvinyl butyral; polyvinyl formal; as well as mixtures thereof.

The photoinitiator system may contain a photoinitiator and, if desired, a sensitizer which extends the spectral response into the near ultraviolet and visible spectral regions.

Preferred photoinitiators include CDM-HABI, i.e., 2-(o-chlorophenyl)-4,5-bis(m-methoxyphenyl)-imidazole dimer; o-Cl-HABI, i.e., 1,1'-biimidazole, 2,2'-bis(o-chlorophenyl)-4,4', 5,5'-tetraphenyl-; and TCTM-HABI, i.e., 1H-imidazole, 2,5-bis(o-chlorophenyl)-4-(3,4-dimethoxyphenyl-), dimer each of which is typically used with a hydrogen donor, e.g., 2-mercapto benzoxazole or 4-methyl-4H-1,2,4-triazole-3-thiol (MMT). MMT is preferred for compositions containing N-vinyl carbazole. Ketones, such as benzophenone, Michler's ketone, and ethyl Michler's ketone, can also be used as sensitizers, with or without HABI.

Useful sensitizers which extend spectral response into the visible include the following:

DEAW, i.e., Cyclopentanone, 2,5-bis-((4-(diethylamino)-phenyl)methylene); and

Dimethoxy-JDI, i.e., 1H-Inden-1-one, 2,3-dihydro-5,6-dimethoxy-2-((2,3,6,7-tetrahydro-1H,5H-benzo[i,j-]quinolizin-9-yl)-methylene)-.

Nonionic surfactants may be added to the photopolymerizable composition as coating aids. Preferred coating aids are polyethylene oxide, such as Polyox® WSRN-3000 and Polyox® WSR-205, and fluorinated nonionic surfactants, such as Fluorad® FC-430.

Other components in addition to those described above can be present in the photopolymerizable compositions in varying amounts. Such components include: plasticizers, optical brighteners, ultraviolet radiation absorbing material, thermal stabilizers, and release agents.

Amounts of ingredients in the photopolymerizable compositions will generally be within the following percentage ranges based on total weight of the photopolymerizable layer: monomer(s), 5%-60%, preferably 15%-50%; initiator system, 0.1%-10%, preferably 1%-5%; binder, 25%-90%, preferably 45%-75%; plasticizer, 0%-25% preferably 0%-15%; other ingredients 0%-5%, typically 1%-4%.

The supports can be any substance transparent to actinic radiation that provides sufficient support to handle the combined film 1 and layer 2. Preferably the support 2 is transparent to light in the spectral region of 0.6 through 1.6 micrometers wavelengths. The term "support" is meant to include natural or synthetic supports, preferably one which is capable of existing in a flexible or rigid film or sheet form. For example, the support or substrate could be a sheet or film of synthetic organic resin, or a composite of two or more materials. Specific substrates include polyethylene terephthalate film, e.g., resin-subbed polyethylene terephthalate film, flame or electro-static discharge treated polyethylene terephthalate film; glass; cellulose acetate film; and the like. The thickness of the supports has no particular importance so long as it adequately supports the film or layer removeably adhered to it. A support thickness of about 25 to 50 micrometers using polyethylene terephthalate provides sufficient rigidity to a film 6 microns thick.

The method of the present invention can be used to form or create elements or devices with at least one optical waveguide for guiding light, the waveguide having at least a double peak or bilobal refractive index profile. Preferably, the waveguide has two lobes in its refractive index profile. However, it is within the scope of this invention for the waveguide refractive index profile to have more than two lobes or peaks, such as three, four or more. When bilobal, the bilobal refractive index profile is across a line in a cross sectional area of the waveguide in a plane substantially perpendicular to a longitudinal axis of a length of the waveguide.

Preferably, the at least a bilobal refractive index profile is in an intersection in a waveguide between at least a first portion of a waveguide, each first portion having a respective axis and at least a second portion of the waveguide, each second portion having a respective axis, whereby the axis (axes) of the first portion(s) and the axis (axes) of the second portion(s) are not parallel and define a plane. For instance, the first portion and the second portion can comprise branches of a waveguide having a Y configuration or an X configuration. The waveguide at such intersections is wider than each one of the first portion and the second portion adjacent the intersection. Preferably, the bilobal refractive index profile is in this wider region or volume of the waveguide.

Preferably, the bilobal refractive index profile is in a direction substantially parallel to the plane defined by the axes of the intersecting first and second waveguide portions. Further, the bilobal refractive index profile is preferably substantially normal to at least one of the first and second axes of the first and second waveguide portions.

Also preferably, the dip between the peaks or lobes in the refractive index profile across a device including a waveguide is between about 10% to about 60% of the maximum difference in the refractive index in the profile.

In accordance with the present invention a method of making an optical waveguide having a bilobal refractive index profile comprises exposing to light at least a first region of a photohardenable material, polymerizing at least one monomer in the material and changing the refractive index of the region to form at least a first optical waveguide having a bilobal refractive index profile. During the polymerizing step, some of the at least one monomer in the film adjacent the region being exposed diffuses into the region becoming the waveguide. By controlling this diffusion into the waveguide region during formation of the waveguide, a double peak refractive index profile can be created across the guide.

A bilobal refractive index profile can be made to occur and to be localized near an intersection of branches, such as at a Y-split or X intersection, by adjusting the exposure conditions and the composition of the photopolymerizable material. For instance, diffusion increases with increased temperatures. Thus, in at least the preferred materials of this invention, increasing the temperature during formation of the waveguide increases the diffusion rate and produces waveguides having more smooth and nearly parabolic lobes or refractive index distributions in the refractive index profile. Therefore, controlling the temperature during the exposing step, for instance in the range of from 20° C. to 50° C., controls the refractive index profile.

The refractive index profile can also be controlled by other means. Since the distance a monomer molecule can diffuse depends in some degree on its probability of reaction with a growing polymer chain, diffusion can be controlled by controlling such factors as the waveguide width; the time, intensity, and the intensity distribution of the exposure; the concentration of the photoinitiator system; and the reactivity and functionality of the monomer or monomers. Since diffusion is a function of molecular weight, shape and size, monomer diffusion can be controlled by controlling the molecular weight, shape and size of the monomer or monomers. Diffusion can also be controlled by controlling the viscosity of the monomer or monomers as well as the glass transition point of the binder. Since some of these properties, such as viscosity, also vary with temperature, variation of temperature and some other factor at the same time may produce a complex interaction. Other variables are the time between exposure and final total polymerization and the temperature at which it sits during this time.

In operation, light can propagate in a fundamental mode through each section of the waveguide corresponding to each of the lobes in the profile. Furthermore, there is substantially no power loss of light passing through an intersection of a waveguide with at least a double peak refractive index profile in the intersection other than the loss per unit length of the waveguide without the intersection. In other words, there appears to be virtually no light scattered from the geometric split of the intersection. As a further illustration, when light passes through a first segment of a waveguide including an intersection having input and output branches, each of the branches having a length L, there is a cumulative light power loss comprising the difference between all light power (P1) entering the first segment minus all light power (P2) exiting the first segment that is substantially the same as a power loss through a second segment of the waveguide having length 2L without an intersection when light power entering the second segment is P1.

The following examples are provided as an illustration of, but does not limit, the invention.

EXAMPLE 1

A substantially dry photohardenable waveguide film of about 5.3 μm thick, having the ingredients listed in Table I, coated on a 25 μm thick clear polyethylene terephthalate support, in approximately a 10 cm × 13 cm section, is exposed to broad band ultraviolet light in the spectral range of 350 to 400 nm through a conventional chrome-plated glass photo-mask to produce a 1×4 (one waveguide end to four waveguide ends or four to one) coupler waveguide pattern. After exposure and then an appropriate delay time of about 15 minutes, the mask is removed.

Next, a first substantially dry photohardenable buffer layer of about 30 μm thick, having the ingredients listed in Table II, coated on a 25 μm thick clear polyethylene terephthalate support, is laminated to the film surface over the waveguide pattern as shown in FIG. 4. The resultant element is subsequently flooded with broadband ultraviolet light. The film support is then removed by mechanical stripping.

Next, a second photohardenable buffer layer of identical composition and structure, as the first buffer layer, with support, is laminated to the opposite surface of the waveguide film and flooded as above.

In subsequent steps, the supports attached to the buffer layers are removed. Sequentially, a third and fourth buffer layer of identical composition and structure as the first buffer layer are laminated to the first and second buffer layers, respectively, with flooding between each lamination and subsequent removal of the buffer layer support to form an optical waveguide device having a buried channel waveguide.

The resultant device is heated at 100° C. for 60 minutes to achieve thermal stability.

The indexes of refraction of the film and layers of the laminated device were determined and are listed in Table III.

TABLE I

| FILM | |
|---|---|
| Ingredient | Weight % |
| Cellulose acetate butyrate, Eastman CAB 531-1 | 56.54 |
| 2-Phenoxyethyl acrylate (POEA) | 35.00 |
| Triethyleneglycol dicaprylate (TDC) | 5.00 |
| 2-Mercaptobenzoxazole (MBO) | 1.89 |
| o-Cl-HABI | 1.00 |
| Sensitizing dye (DEAW)[1] | 0.56 |
| 2,6-Di-tert-butyl-4-methylphenol (BHT) | 0.01 |

[1] 2,5-Bis([4-(diethylamino)-phenyl]methylene)cyclopentanone

TABLE II

| BUFFER LAYER[1] | |
|---|---|
| Ingredient | Weight % |
| CAB[1] 381-20 | 45.49 |
| POEA[2] | 20.00 |
| N-Vinylcarbazole (NVC) | 15.00 |
| Ethoxylated bisphenol A diacrylate, Sartomer 349 | 15.00 |
| o-Cl-HABI[3] | 3.00 |
| 4-Methyl-4H-1,2,4-triazole-3-thiol (MMT) | 1.50 |
| BHT[4] | 0.01 |

[1] Cellulose acetate butyrate
[2] 2-Phenoxyethyl acrylate; CAS 48145-04-6
[3] 1,1'-Biimidazole, 2,2'-bis-O-chlorophenyl-4,4', 5,5'-tetraphenyl; CAS 1707-68-2
[4] 2,6-Di-tert-butyl-4-methylphenol

TABLE III

| Layer or Film | REFRACTIVE INDEX |
|---|---|
| Active (non-exposed) Film | 1.535 |
| Waveguide Region of Film | 1.566 Avg. |
| Buffer Layer No. 1 | 1.545 |
| Buffer Layer No. 2 | 1.548 |
| Buffer Layer No. 3 | 1.545 |
| Buffer Layer No. 4 | 1.548 |

Examples 2-4 illustrate the effect of wait time on the refractive index profile of waveguide 7 and on the difference in refractive index between waveguide 7 and waveguide film 1 after the hardening step.

EXAMPLE 2

This example describes a single-mode buried-channel waveguide demultiplexer in accordance with the present invention.

The device consists of a Y-branch power splitter fabricated in substantially dry photohardenable film, with a holographic grating formed at the junction of two branches. With reference to FIG. 15, grating 60 is designed to reflect incident light with a wavelength of 1335 nm launched into input path 52 preferentially into output patch 54. Light with a wavelength of 1550 nm launched into input path 52 will pass through grating 60 and leave demultiplexer 50 via transmission path 56.

The compositions listed in Table IV were coated from 95:5 dichloromethane/methanol onto a support of clear 50 micrometer thick polyethylene terephthalate. The waveguide film was coated at 22.5% total solids; the buffer layer was coated at 26% total solids. (It should be understood that "total solids" refers to the total amount of nonvolatile material in the coating solution even thought some of the ingredients may be nonvolatile liquids at ambient temperature.) The coating were passed through a heated dryer and a 23 micrometer thick polyethylene terephthalate coversheet laminated to each coating as it emerged from the dryer.

TABLE IV

| Ingredient[1] | Waveguide Film (% by weight) | Buffer Layer (% by weight) |
| --- | --- | --- |
| CAB 531-1[2] | 53.84 | — |
| CAB 551-0.2[2] | — | 54.83 |
| Photomer ® 4039[3] | 27.00 | 33.28 |
| Sartomer 349 | 5.00 | 4.75 |
| N-Vinyl carbazole | 8.00 | — |
| o-Cl-HABI | 1.00 | 0.95 |
| MMT | 1.90 | 1.90 |
| EMK[4] | — | 0.48 |
| Benzophenone | — | 2.85 |
| DEAW | 0.25 | — |
| BHT | 0.01 | — |
| Polyox ® WSR-205[5] | 3.00 | 0.95 |
| Thickness in micrometers | 6.0 μm | 32.7 μm |

[1]See also Tables I and II for descriptions of ingredients.
[2]Cellulose acetate butyrate; Eastman Chemical Products, Kingsport, Tenn.
[3]Phenol ethoxylate monoacrylate; CAS 56641-05-5; Henkel Process Chemical Company.
[4]Ethyl Michler's ketone; 4,4'-bis(diethylamino)-benzophenone; CAS 90-93-7.
[5]Polyethylene oxide, MW 600,000; Union Carbide corporation.

To form waveguide 7 in waveguide film 1, the coversheet was removed from an approximately 10×13 cm section of the substantially dry photohardenable film described in Table IV, exposing film second surface 4, and film second surface 4 laminated at room temperature to a conventional 13 cm chrome plated on quartz photomask, designated the first photomask, with the chrome in contact with second surface 4. Film 1 was exposed through the photomask to about 3.5 mJ of broadband ultraviolet radiation (about 350 to 400 nm) at a power density of 3.5 mW/cm² at 38° C.

Following exposure, first photomask and exposed film 1 were heated for 1 min at 38° C. Next, a second chrome plated on quartz photomask was placed over support 2 with the chrome in contact with support second surface 6. The second photomask contains a rectangular 250 micrometer by 50 micrometer aperture. The second mask was hand-aligned to the first photomask using a microscope under safe-light illumination, so that the aperture was over branching region 58, with the top of the aperture slightly above branch 66 and the aperture extending down branching region 58.

The member consisting of, in order, first photomask, exposed photohardenable film 1, support 2, and second photomask was exposed to form grating 60. Exposure was carried out by an argon-ion laser whose 488 nm beam was split, expanded, collimated and recombined with an angle of approximately 68 degrees in a standard holographic grating setup, similar to that described in U.S. patent application Ser. No. 07/144,355 filed Jan. 15, 1988, with the second photomask orientated toward the interfering beams. Film 1 was exposed to the two interfering beams for 30 sec at a beam intensity of about 3.2 mW/cm² per beam, forming grating 60 oriented 90° to the direction of waveguide 7, and distributed throughout the thickness of film 1. Grating 60 extends approximately 200 microns along branching region 58 and is about 50 micrometers wide, extending on either side of waveguide 7.

The first and second photomasks were removed to form an member consisting of exposed film 1 and support 2. The coversheet was removed from a substantially dry photohardenable (buffer) layer, described in Table IV, and buffer layer first surface 16 laminated to second surface 4 of film 1 at 60° C. The resulting member was heated for 30 min at 38° C. Support 2 was removed from film 1 and second buffer layer 18 laminated to first surface 3 of film 3 at 60° C. The resulting member, support 17, buffer layer 14, exposed film 1, buffer layer 18, and support 21, was heated for an additional 30 min at 38° C. Then the member was exposed to broadband ultraviolet radiation for about 2 sec on each side. The was followed by exposure to about 2000 mJ (about 6 min) of broadband ultraviolet radiation.

By a similar procedure two additional buffer layers, one laminated to layer 14 and one laminated to layer 18, were added. Support 17 was removed and the third buffer layer laminated to the surface thus exposed. Support 21 was removed and the fourth buffer layer laminated to the surface thus exposed. The resulting element was exposed to about 2000 mJ (about 6 min) of broadband ultraviolet radiation on each side and left under a bank of fluorescent light for about 1 hr to fade the sensitizing dye. Then it was heated to 80° C. for 1 hr, cooled, and heated to 90° C. for an additional hour. Then the device was cut and microtomed.

Figure 16:
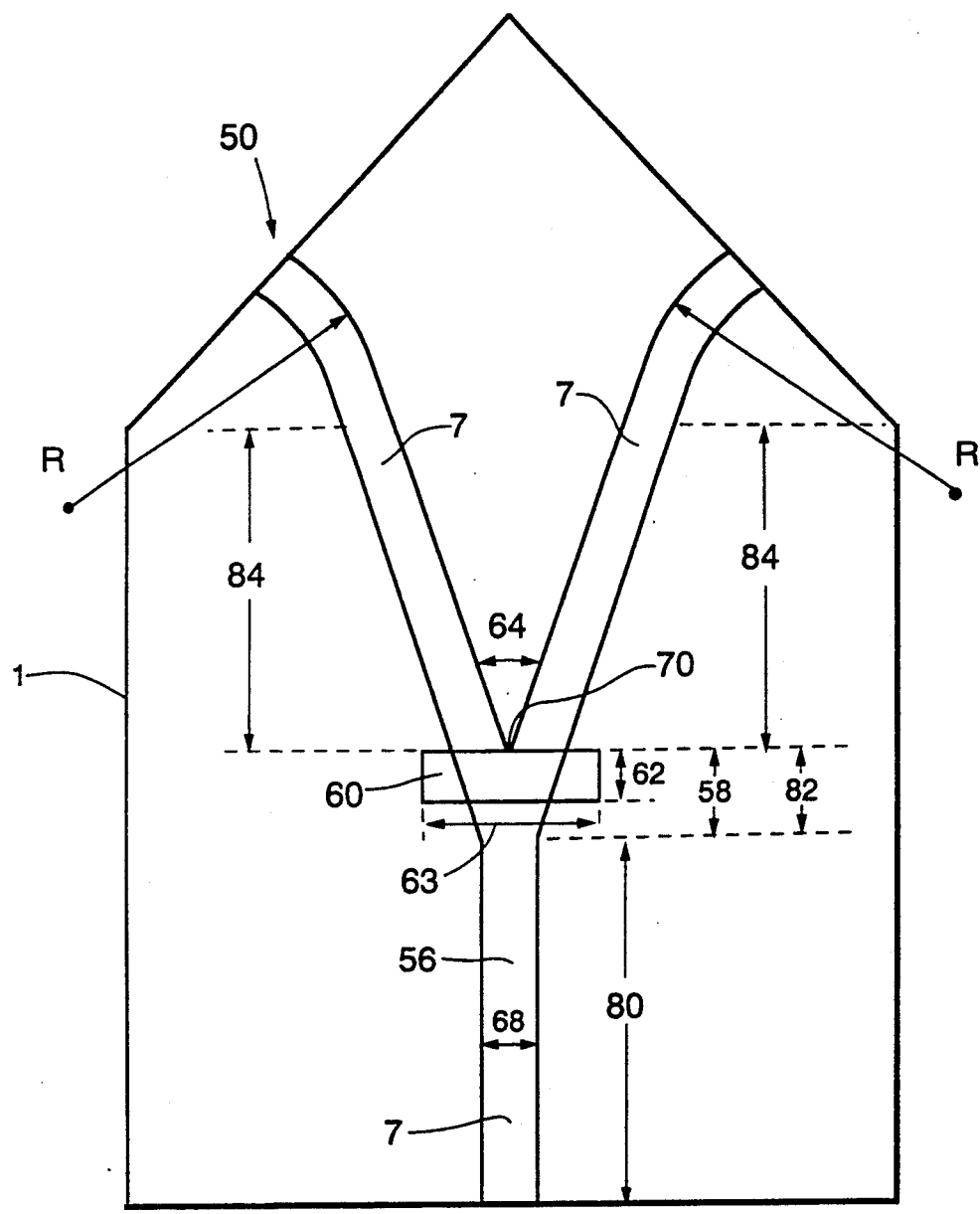
FIG. 16 represents a top view of a demultiplexer of the present invention as described in Example 2.

FIG. 16 represents a top view of the device made in Example 2. Waveguide 7 has width 68 of 8 micrometers. Transmission region 56 has a length 80 of 0.6 cm. Branching region 58 has length 82 of 500 micrometers, during which time the width of waveguide 7 increases from 8 micrometers to 16 micrometers at branch point 70. Grating 60 in branching region 58 has length 62 of about 200 micrometers and width 63 of 50 micrometers. At branch point 70 input path 52 and output path 54 separate symmetrically at branching angle 64 of 4 degrees. Separation straights 84, i.e, straight sections of waveguide following a Y-branch, are 0.50 cm. Following separation straights 84, waveguide 7 of input region 52 and of output region 54 are curved with radius of curvature R of 2.0 cm. The device is cut at an angle so that the ends of the waveguide in input region 52 and output region 54 are normal to the edges of the device.

Optical fibers were butt-coupling to the microtomed edges of the various device ports using an index matching fluid (Cargille Series AA 1.458, Cargille Laboratories, Cedar Grove, NJ). The single mode fiber was aligned using precision mechanical positioning stages so that it was approximately perpendicular to the microtomed edge of waveguide 7 and less than 50 micrometers from the waveguide with index matching fluid between the fiber and waveguide. The output fiber was coupled in a similar manner. The light source was a PTI Model 01001-SF monochromator (Photon Technology Industries, Princeton, NJ) with a Xenon arc lamp source, allowing the test wavelength to be scanned from 850 nm to 1550 nm.

With a 9 micrometer single mode fiber (Corguide ® SMF 28, Corning Glass Works, Corning, NY) attached to coupling means 70 of input path 52 and a standard fifty micrometer core multimode fiber attached to coupling means 72 of output path 54, light was launched into input path 52 and the output from output path 54 measured using phase sensitive detection. The output of the monochromator was chopped with a standard optical radiation chopper at 500 Hz placed between the monochromator output slit and the single mode optical fiber. The end of the output fiber was positioned approximately 5 millimeters from the active element of a thermoelectric cooled United Detector Technology germanium photodiode detector (UDT Model S1261-TE), in an otherwise light tight-housing. The output of the detector went to a trans-impedance amplifier, which locked in to the chopper frequency and measured the synchronous detector signal. With 1335 nm light, the output signal was 13.8 dB less than the input signal. With wavelengths shorter than 1312 mn or longer than 1370 nm, the output signal was more than 30 dB less than the input signal. The width of the bandpass at half-maximum is about 15 nm.

With a 9 micrometer single mode fiber attached to coupling means 70 of input path 52 and a 50 micrometer multimode fiber attached to coupling means 74 of transmission path 56 light was launched into input path 52 and the output from output path 56 measured. With 1300 nm light, the output signal was 11.3 dB less than the input signal. With 1335 nm light, the output signal was 16.5 dB less than the input signal.

To measure the near-end rejection ratio (NERR, i.e., the signal reflected back into the input path by the grating), a 2:2 fiber splitter was inserted between the source and the device. The signal reflected by the device back into the input fiber was split so that approximately half of the reflected signal was could be measured at one port of the slitter. At 1335 nm, the intensity of the signal reflected back into the input fiber was at least 11 dB below that of the output signal, and at least 25 dB below that of the input signal.

The preferred embodiments described herein are provided for the purpose of depicting a typical implementation of the invention; the scope of the invention is, however, defined by the appended claims and their equivalents.

What is claimed is:

1. A substantially dry method for forming an optical multiplexing-demultiplexing device, said device comprising a branched optical waveguide formed in a laminated matrix, said waveguide comprising a branching region for dividing a transmitting optical path into an input optical path and an output optical path, said branching region comprising a volume grating, said method comprising the steps of:
   (A) providing a substantially dry photohardenable film having first and second surfaces, with a support removably adhered to the first surface;
   (B) exposing the film to form the optical waveguide comprising a transmitting path, an input path, an output path, and a branching region;
   (C) exposing the film to form a holographic diffraction grating in the branching region of the optical waveguide;
   (D) laminating a first surface of a first substantially dry photohardenable layer to the film second surface, with a support removably adhered to a second surface of the first layer;
   (E) removing the support form the film first surface;
   (F) laminating a first surface of a second substantially dry photohardenable layer to the film first surface, with a support removably adhered to a second surface of the second layer; and
   (G) hardening the layers and film forming a hardened matrix, substantially fixing the indices of refracting of the layers and the film, and forming at least one buried waveguide;
   said steps being carried out in the order indicated except that step (C) may be carried out after step (A), step (B), step (D), step (E), step (F), or step (G).

2. The method of claim 1 wherein the holographic diffraction grating is formed by intersecting at least two coherent light beams.

3. The method of claim 1 wherein the holographic diffraction grating is formed by directing a coherent light beam through a hologram of a grating.

4. An optical multiplexing-demultiplexing device for use in an integrated optical system, said device comprising:
   a photohardenable film having a first and a second surface thereon, the waveguide forming part of an optical circuit;
   the waveguide comprising an input path, a branching region, a transmitting path, and an output path disposed so that light launched into the input path passes sequentially through the input path, the branching region, and either the transmitting path or the output path;
   the branching region comprising a holographic volume diffraction grating disposed so that light of a predetermined wavelength launched into the input path passes sequentially through the input path, the branching region, and the output path, whereas light not of the predetermined wavelength launched into the input path passes sequentially through the input path, the branching region, and the transmission path; and
   a first and a second photohardenable layer respectively disposed on the first and second surfaces of the film in respective positions above and below the film.

5. An optical multiplexing-demultiplexing device for use in an integrated optical system, said device comprising:
   a photohardenable film having a first and a second surface thereon, the waveguide forming part of an optical circuit;
   the waveguide comprising an input path, a branching region, a transmitting path, and an output path disposed so that light launched into the input path passes sequentially through the input path, the branching region, and either the transmitting path or the output path;
   the branching region comprising a holographic volume diffraction grating disposed so that light of a predetermined wavelength launched into the input path passes sequentially through the input path, the branching region, and the output path, whereas light not of the predetermined wavelength launched into the input path passes sequentially through the input path, the branching region, and the transmission path; and
   a first and a second photohardenable layer respectively disposed on the first and second surfaces of the film in respective positions above and below the film.

* * * * *